United States Patent [19]
Anderson et al.

[11] Patent Number: 5,683,203
[45] Date of Patent: Nov. 4, 1997

[54] METHOD AND APPARATUS FOR SUPPORTING PADMOUNT TRANSFORMER

[75] Inventors: Donald W. Anderson, 1857 Hayes Leonard Rd.,, Valparasio, Ind. 46383; Dieter John Trimolt, Hammond,, Ind.

[73] Assignee: Donald W. Anderson, Valparasio, Ind.

[21] Appl. No.: 598,034

[22] Filed: Feb. 7, 1996

[51] Int. Cl.⁶ .................................................. F16L 1/00
[52] U.S. Cl. ........................... 405/154; 248/49; 138/104; 405/157; 405/303
[58] Field of Search ..................... 405/282, 283, 405/272, 273, 154, 156, 157, 303; 248/49, 55; 138/104, 105

[56] References Cited

U.S. PATENT DOCUMENTS

| | | | |
|---|---|---|---|
| 3,159,978 | 12/1964 | DeLillo | 405/282 |
| 3,747,355 | 7/1973 | Howard | 405/157 |
| 3,819,847 | 6/1974 | Charles | 405/157 X |
| 4,653,958 | 3/1987 | Anderson et al. | 405/157 |
| 5,073,066 | 12/1991 | Richland | 405/282 X |
| 5,192,165 | 3/1993 | Torielli | 405/156 |
| 5,195,849 | 3/1993 | Stapleton | 405/282 |

FOREIGN PATENT DOCUMENTS 0226409  9/1988  Japan ......................... 405/282

*Primary Examiner*—Dennis L. Taylor
*Attorney, Agent, or Firm*—Ryan M. Fountain

[57] ABSTRACT

A method and apparatus for installing a padmount transformer using a buried support frame is provided wherein the transformer is mounted adjacent a trench about the underground cable, the frame includes a pair of telescopically extendable legs which rest on the trench bottom. Each of those legs reaches to the top of the trench and is removably attached at that upper end to one of a pair of arms that rest on the surface of the ground under where the floater pad is to be placed. A stabilizing bar is removably attached to each of the legs to secure them in a desired relative position. The position of each of these frame elements can be adjusted to permit the top of the frame to be made level. The relatively compact ground at the bottom of the trench and the surface adjacent the trench secures the frame against significant or uneven changes in vertical position over time. The rigidity of the assembled frame and the dirt used to fill in the trench secures the frame against significant or uneven changes in lateral position over time.

13 Claims, 4 Drawing Sheets

METHOD AND APPARATUS FOR SUPPORTING PADMOUNT TRANSFORMER

BACKGROUND AND SUMMARY OF THE INVENTION

The present invention relates generally to installation of surface structures for housing equipment that is supplied by or connected to underground cables, conduits or the like. More particularly, the present invention relates to the installation of padmount transformers connected to buried electrical cables in residential environments.

Previous, padmount transformers have been connected to underground electrical cables by digging a trench to expose a portion of the cables and mounting the transformer beside or partially on top of the trench area. More specifically, after the trench is dug, the cable ends are run upward to the surface. The trench is then filled in with the cable ends protruding above the ground surface. A floater pad is then place over the cable ends and often rests on or beside the area where the trench used to be. The transformer hardware is then placed on the floater pad and connected to the cable ends.

Unfortunately, unless extra effort is made the ground over the filled in trench is typically not as compacted as the adjacent ground, and over time settling can occur which lower the ground surface where the trench used to be. As a result, when the floater pad rests on the ground surface where the trench used to be, the floater pad and the transformer hardware can sink into the ground. That sinking can occur evenly, as where the entire floater pad is over a settling trench, or unevenly, as where one or more sides of the floater pad are over the trench or adjacent the trench and the trench walls crumple into the sinking trench fill.

Also, when installing a padmount transformer it is usually advantageous to level the ground surface upon which the floater pad is placed. Due to the loose nature of the soil and dirt near the ground surface and the generally planar nature of the site it is not always easy to obtain the desired leveling. Moreover, in residential housing developments where large areas of fill are deposited for landscaping, settling of that fill over time can eliminate the effect of the original leveling.

In either situation, such settling and/or uneven placement of the transformer can detrimentally effect the performance, reliability and longevity of the transformer. Previously, extra effort and/or equipment was needed to provide for proper placement at installation and/or additional maintenance was required. Unfortunately, those methods could significantly increase the equipment and manpower costs of installation and complicate or interrupt continued electric service.

Accordingly, it is an object of the present invention to provide an improved method and apparatus for supporting and mounting padmount transformers. Other objects include the provision of a method and/or apparatus for padmount transformer installation which:

a. inexpensive to manufacture and easy to install,
b. utilizes conventional installation equipment,
c. supports the transformer against ground settling,
d. accommodates a variety terrain and placement orientation, and
e. facilitates level placement of the transformer.

These and other objects of the present invention are obtained by the provision of a method of installing the padmount transformer by disposing a frame structure under the floater pad, particularly a frame which is founded in the trench containing the connection cables. The frame includes a plurality adjustably attached members which can be locked into a fixed relation with one portion receiving and supporting the floater pad and another portion mounted on a relatively stabilized area of the subsoil. The frame can receive and contain the cable ends rising from the trench into the transformer.

In preferred embodiments where the transformer is mounted adjacent a trench about the underground cable, the frame includes a pair of telescopically extendable legs which rest on the trench bottom. Each of those legs reaches to the top of the trench and is removably attached at that upper end to one of a pair of arms that rest on the surface of the ground under where the floater pad is to be placed. A stabilizing bar is removably attached to each of the legs to secure them in a desired relative position. The position of each of these frame elements can be adjusted to permit the top of the frame to be made level. The relatively compact ground at the bottom of the trench and the surface adjacent the trench secures the frame against significant or uneven changes in vertical position over time. The rigidity of the assembled frame and the dirt used to fill in the trench secures the frame against significant or uneven changes in lateral position over time.

Other objects, advantages and novel features of the present invention will now become readily apparent to those skilled in the art upon consideration of the drawings and detailed description below.

DETAILED DESCRIPTION OF PREFERRED EMBODIMENTS

It should be noted that in order to promote clarity and ease of understanding by the reader, the dimensions of the elements shown in the figures are exaggerated and are not drawn to scale from one figure to the next.

Figure 1:
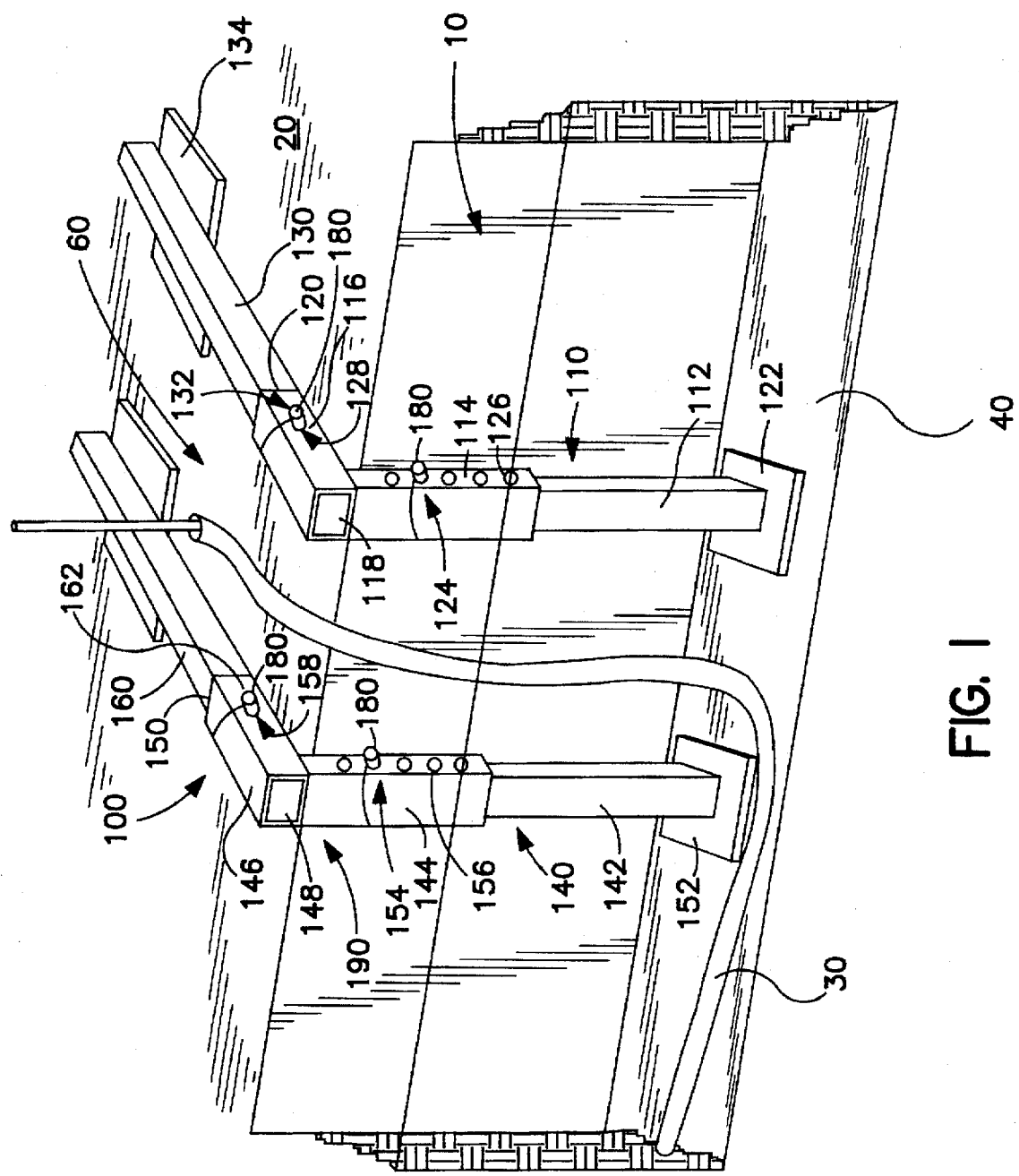
FIG. 1 shows a front, right, upper perspective view of an embodiment of the present invention disposed within and adjacent to a trench, having the cross arm removed.

FIG. 1, which illustrates a preferred embodiment of the present invention, shows a trench 10 created to extend below ground surface 20 and expose buried electrical cables 30 or like conduits near the bottom or floor 40 of trench 10. For ease of understanding, only a single such cable 30 is depicted in the drawings, but it should be understood that in actual practice a plurality of electrical cables would usually be involved. The desired location of the padmount transformer 50 is selected adjacent and/or overlapping trench 10 in whole or part. As shown, padmount transformer 50 is mounted in area 60 on ground surface 20, and trench 10 is dug adjacent or slightly under area 60 to one side.

In general, frame structure 100 of the present invention preferably includes a pair of leg members 110 and 140, a pair of arm members 130 and 160 and a cross arm member 170. In using such a structure, each arm member would be connected to a leg member. Each such set of leg/arm members would be disposed in spaced apart relation in trench 10, such as is shown in FIG. 1, and then connected by the cross arm member.

Figure 2:
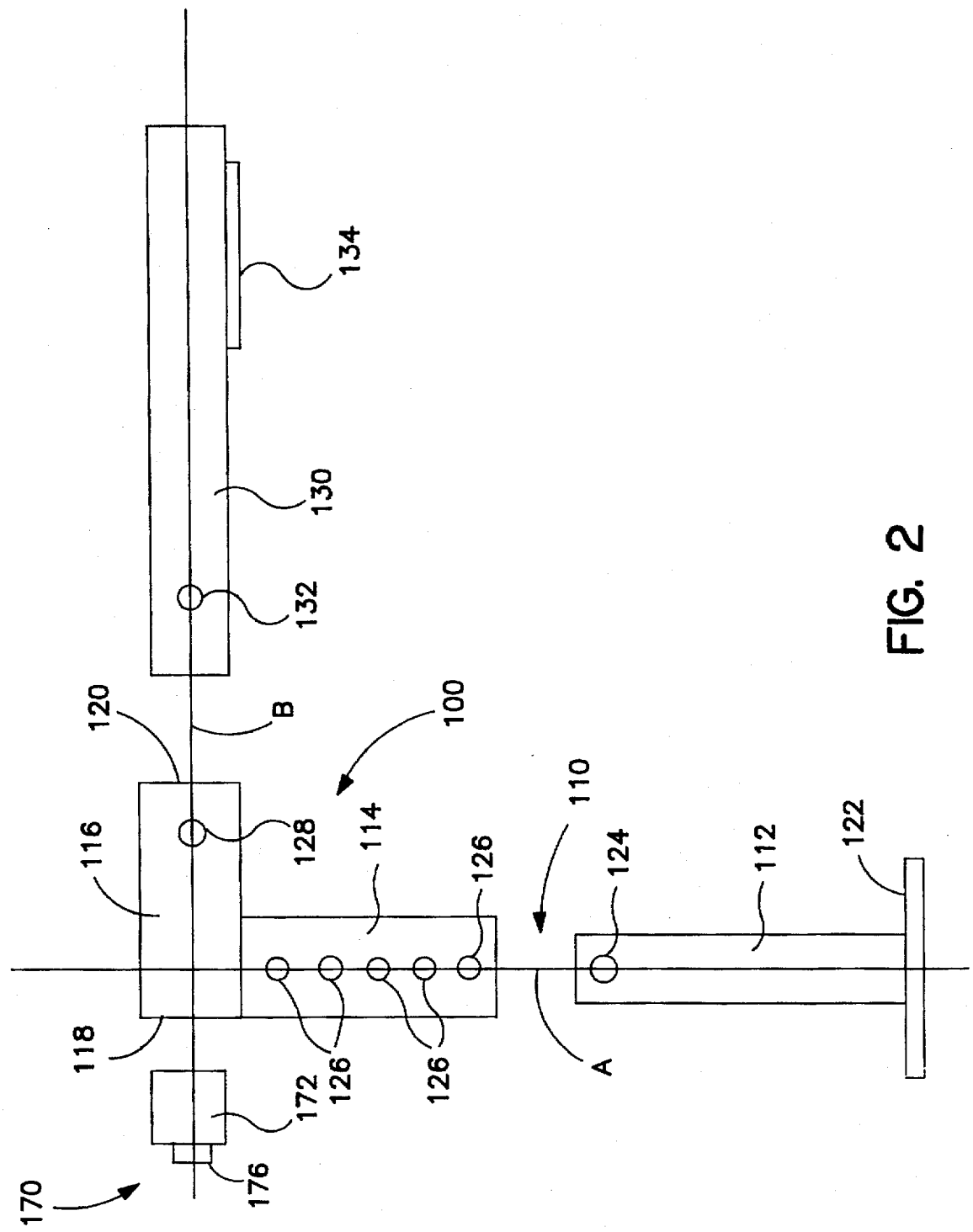
FIG. 2 shows a right side exploded view of the frame of FIG. 1, illustrating a leg and arm set with the cross arm.

More specifically, leg members 110 and 140 are preferably formed identically from square tubing. Likewise, arm members 130 and 160 are preferably formed identically from square tubing. The set of leg member 110/arm member 130 is shown in FIG. 2; the set of leg member 140/arm member 160 being substantially identical thereto in construction.

Leg member 110 includes a lower part 112 and an upper part 114 which are, for example, telescopically interfit so that lower part 112 can readily slide into and out of upper part 114 along axis A. Leg member 110 also includes an upper bracket 116, preferably formed from square tubing, for receiving arm member 130, also preferably formed from square tubing. Bracket 116 is, for example, open at both ends 118 and 120. As illustrated, cross arm 170 includes two inserts 172 and 174, each formed from square tubing, connected by bar or tube 176. The interior dimensions of bracket 116 are preferably selected to closely receive either of inserts 172 and 174 at end 118 and slidably receive arm member 130 at end 120, both along axis B. In preferred embodiments, axis A and B are at right angles to each other.

Lower part 112 includes base plate 122 at one end and at least one adjustment hole 124 along its length. Where leg member 110 is formed by square tubing, adjustment hole 124 preferably passes completely through lower part 112, from one side to the other. Similarly, upper part 114 includes a plurality of adjustment holes 126 along its length. Adjustment holes 124 and 126 are dimensioned to correspond in size and are aligned such that telescopic sliding of lower part 112 into upper part 114 will cause holes 124 and 126 to register with each other to form linear passageways through leg member 110.

Bracket 116 includes at least one locking hole 128 along its length and preferably adjacent end 120. Arm member 130 includes at least one corresponding locking hole 132. These locking holes preferably extend from one side of bracket 116 and arm member 130 to the other side, are dimensioned to be similar in size, and are aligned such that telescopic sliding of arm member 130 within bracket 116 will cause holes 128 and 132 to register with each other to form a linear passageway through bracket 116. Although not shown explicitly in the drawings, bracket 116 and insert 172 and/or 174 can also be formed with such locking holes. In especially preferred embodiments, arm member 130 is formed with a base plate 134 mounted to its lower surface.

Similarly, leg member 140 preferably includes a lower part 142, an upper part 144, an upper bracket 146 which is open at ends 148 and 150, a base plate 152, at least one adjustment hole 154, adjustment holes 156 and at least one locking hole 158. Likewise, arm member 160 preferably includes at least one locking hole 162 and a base plate 164. These elements of leg member 140 and arm member 160 are arranged in the same manner and perform the same functions as the corresponding elements of leg member 110 and arm member 130 described above.

Lock pins 180 are provided to be inserted into adjustment and locking holes to prevent relative movement of the leg member parts and of the arm members with respect to the brackets. These locking pins can, for example be formed from conventional stainless steel wire lock pins. Also, it has been found to be advantageous to include a grounding lug 190 formed from a threaded bolt and nut secured to one or more upper parts or brackets of the leg members 110 and 140.

In an exemplary embodiment used to support up to a 100 kva single phase transformer, base plates 122, 134, 152 and 164 are formed from ¼" thick flat plate steel cut in a 6"×"6" square, lower parts 112 and 142 and arm members 130 and 160 are formed from 14 gauge tube steel 1¼" wide on each side and 42" long, upper parts 114 and 144 and brackets 116 and 146 are formed from 14 gauge tube steel 1½" wide on each side (the upper parts being 18" long and the brackets being 4¾" long), inserts 172 and 174 are formed from the same material as arm members 130 and 160 (but being only 2" long), bar 176 is formed from ⅛" tube steel which is 35" long and locking pins 180 are formed as 5/16×2 ¾" stainless steel.

During installation, trench 10 is dug about at least a portion of where cables 30 are buried in the vicinity of where padmount transformer 50, or another like device, is to be located. Alternatively, the installation can occur during the initial placement of cables 30. A typical method of using frame structure 100 according to the present invention includes the steps of placing leg members 110 and 140 in trench 10 adjacent area 60 and about 35" apart on either side of where cable(s)30 are to be deployed, preferably with base plates 122 and 152 resting on floor 40 or like solid ground. Arm members 130 and 160 are similarly placed in area 60 about 35" apart with base plates 134 and 164 resting on ground surface 20. Upper parts 114 and 144 are then raised to the top of trench 10 in alignment with arm members 130 and 160 and locked into position by insertion of locking pins 180 into adjustment holes 124 and 126, and 154 and 156, respectively. At that time, arm members 130 and 160 are also secured in brackets 116 and 146, respectively, by insertion of locking pins 180 into locking holes 128 and 132, and 158 and 162, respectively. If desired in a given application, a grounding wire or rod can be connected to lug 190.

Figure 3:
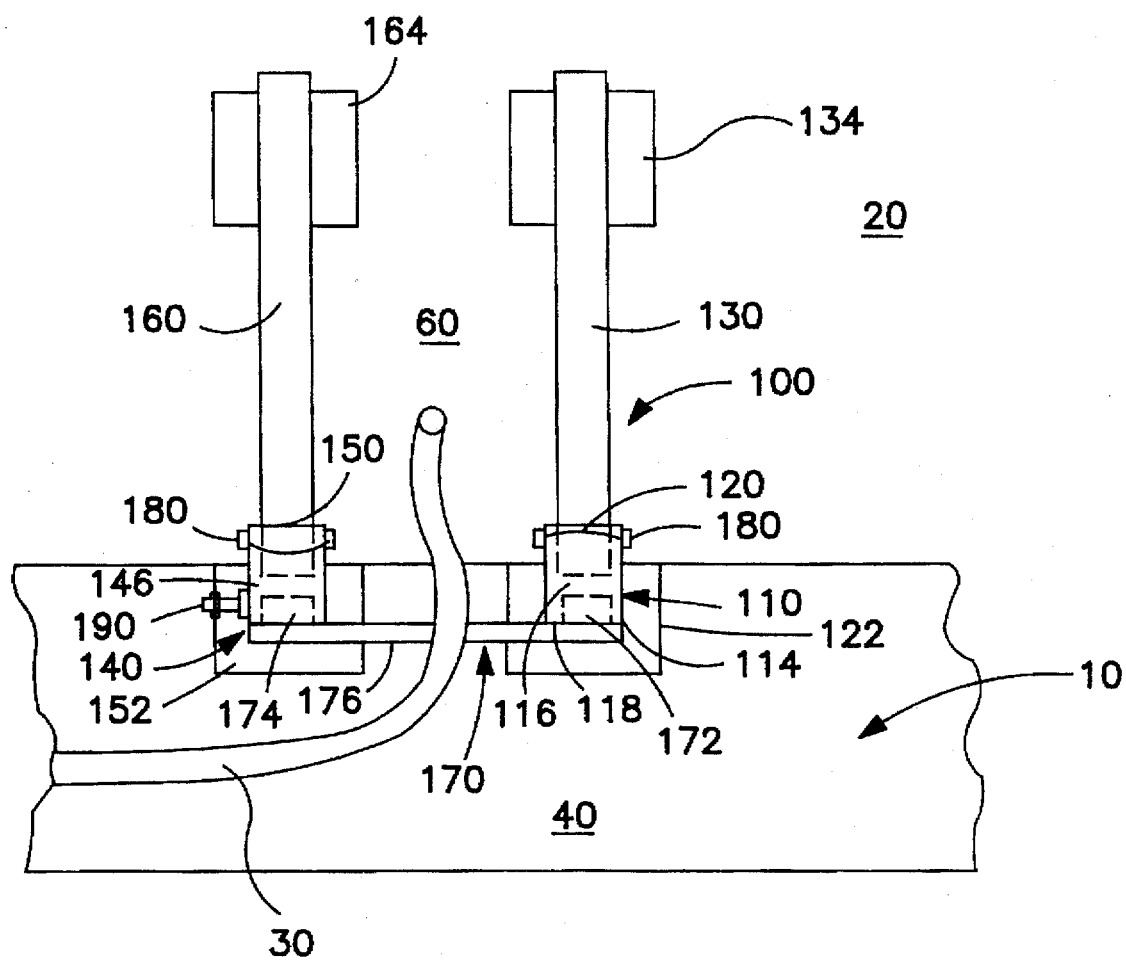
FIG. 3 shows a top view of the embodiment of FIG. 1, having the cross arm installed between the pair of legs.

At this point it has been found to be advantageous to place cable(s) 30 in the desired location of area 60 using the method and apparatus for padmount transformer installation described in co-pending U.S. patent application Ser. No. 08/137,462, filed by one of the present inventors. The disclosure of that case is specifically incorporated herein by reference. Thereafter, cross arm 170 is employed to stabilize leg members 110 and 140 and positively locate cable(s) 30 between the leg members by disposing inserts 172 and 172 into ends 118 and 148, as shown in FIG. 3.

Prior to filling in trench 10, frame structure 100 can be leveled in two dimensions, vertically and laterally with respect to each arm member and between arm members. Trench 10 is then preferably filled in and frame structure 100 covered up to the level of the top of the arm members. Before final grading of the ground surface in area 60 around and between frame structure 100, cross arm 170 can be removed if it is not desired as a permanent part of frame structure 100.

Figure 4:
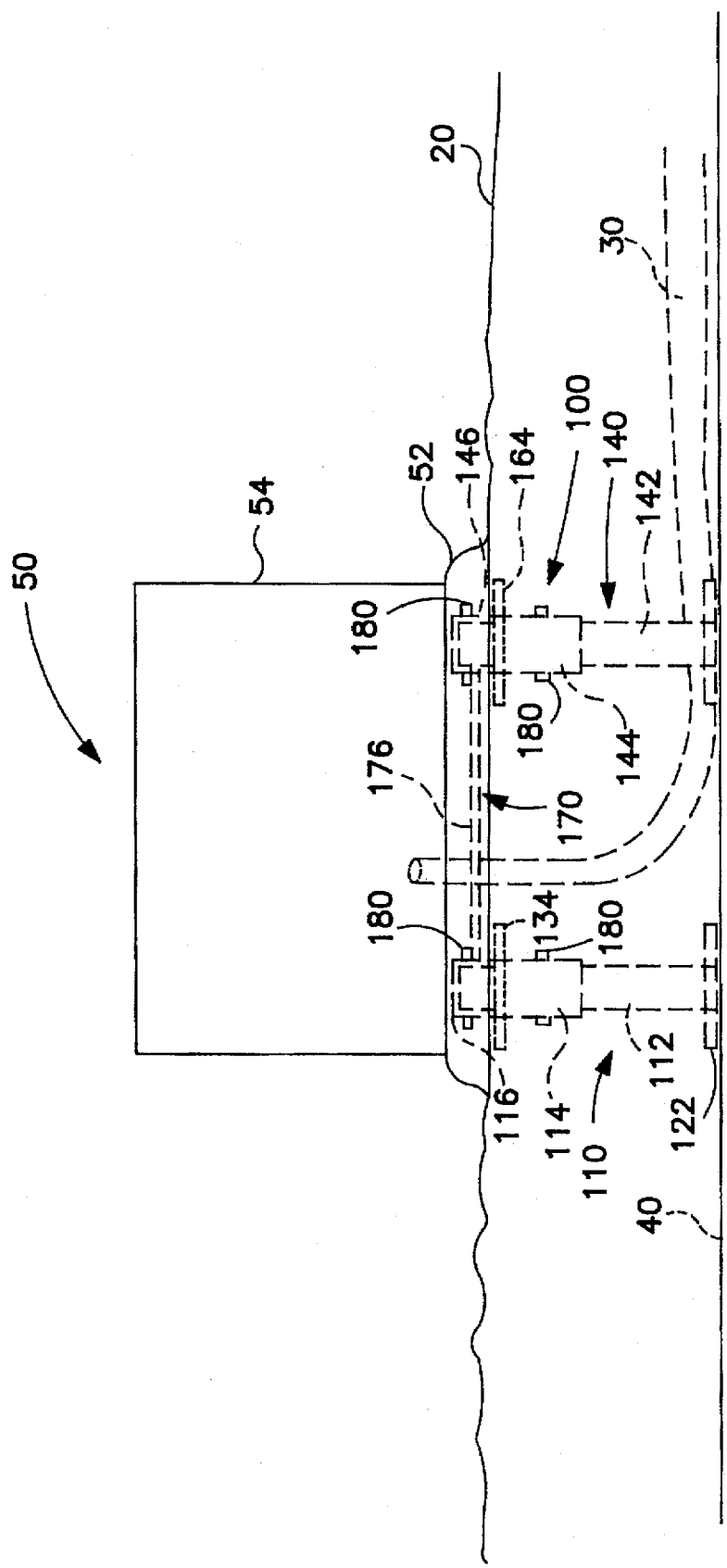
FIG. 4 shows a back view of the finished installation of the embodiment of FIG. 1 with the buried features shown in broken lines.

As shown in FIG. 4, padmount transformer 50 is illustrated as a conventional assembly which includes a floater pad 52 and transformer hardware 54 connected thereto. After grading of the ground surface about frame structure 100, floater pad 52 is placed on arm members 130 and 160, with cable(s) 30 rising through floater pad 52 via a conventional aperture therein. Transformer hardware 54 is then attached to floater pad 52 by conventional means.

Although preferred embodiments of the present invention have been described above in detail, the same is by way of illustration and example only, and not as a limitation. Those of skill in this art will now readily appreciate that various adaptations can be made within the spirit of this invention.

Accordingly, the spirit and scope of the present invention are only limited by the scope of the claims below.

What is claimed is:

1. A method of supporting an above-ground platform connected to underground cables, comprising:

creating a trench about a portion of the underground cables, selecting a platform location adjacent the trench, then placing at least one leg member within the trench adjacent to the platform location and at least one arm member within the platform location, then connecting the arm member to the leg member such that the leg member supports and positively locates the arm member with respect to the platform location, then positioning the cables from the trench to the platform location, then filling in the trench at least to the level of the platform location, and then placing the platform over the arm member such that the arm member supports the platform at least in part.

2. The method according to claim 1 wherein the platform location is selected so as to overhang the trench at least in part, and the leg members are positioned within the trench so as to rest on the bottom of the trench and extend upward to the platform location.

3. A method of supporting an above-ground padmount transformer connected to underground electrical cables, comprising:

creating a trench about at least a portion of the underground electrical cables, that trench having a bottom and at least two sides extending upwardly to the ground surface, selecting a transformer location adjacent the trench and at least in part on the ground surface, then placing a pair of spaced apart leg members into the trench adjacent the transformer location and placing a pair of spaced apart arm members within the transformer location, and connecting each arm member to a leg member such that the leg member supports and locates each arm member with respect to the transformer location, then positioning the cables from the trench to the transformer location, and then filling in the trench to cover the cables and placing the transformer over the arm members such that the arm members support the transformer at least in part.

4. The method according to claim 3 wherein the leg members rest on the bottom of the trench and extend upwardly to the ground surface, the connection of the arm members to the leg members provides vertical support for the arm members, and prior to filling in the trench the arm members and/or leg members are adjusted such that the arm members are sufficiently leveled to properly support the transformer.

5. The method according to claim 3 wherein the cables are positioned from the trench to the transformer location between the leg members and thereafter the leg members are stabilized with respect to each other by a cross arm member connected between them and the trench is filled in sufficiently to fix the location of the leg members.

6. An apparatus for supporting an above-ground padmount transformer assembly connected to underground electrical cables, that transformer assembly including a floater pad for resting on or adjacent the ground surface and transformer hardware to be connected to and supported by the floater pad, the electrical cables being disposed in a trench adjacent to the ground surface location upon which the transformer assembly is to be mounted, the apparatus comprising a means for receiving the floater pad thereon and providing level support for the floater pad substantially without regard for ground surface settling under the floater pad after installation of the transformer assembly.

7. The apparatus according to claim 6 including:

at least a first leg member having a lower part and an upper part telescopically mounted with respect to the lower part so as to permit the length of the leg member to be adjusted, at least a first arm member, and a first bracket means secured to the first leg member for removably retaining the first arm member in a predetermined orientation with respect to the first leg member.

8. The apparatus according to claim 7 wherein that predetermined orientation is substantially orthogonal with respect to the direction of the length of the first leg member, and the apparatus includes means connected to the first arm member for electrically grounding the apparatus during installation and use.

9. The apparatus according to claim 7 including:

a second leg member having a lower part and an upper part telescopically mounted with respect to the lower part so as to permit the length of the leg member to be adjusted, a second arm member, and a second bracket means secured to the second leg member for removably retaining the second arm member in a predetermined orientation with respect to the second leg member.

10. The apparatus according to claim 9 including a stabilizer means removably connected to the first arm member and to the second arm member for fixing the relative location of those arm members in a given spaced apart orientation with respect to each other.

11. The apparatus according to claim 10 including first locking means connected between each of the lower and upper parts of the first and second arm members for maintaining a desired length of the leg members, second locking means connected to each of the bracket means for maintaining the connection between the arm members and the leg members once the predetermined orientations are achieved, and plate elements connected to a free end of each of the lower parts of the leg members for supporting the apparatus on bottom portions of the trench.

12. The apparatus according to claim 11 including plate elements connected adjacent to the free end of the arm members for supporting the arm members adjacent the ground surface outside of the trench.

13. The apparatus according to claim 10 wherein the first and second bracket means each include a tubular length open at one end to receive the arm members and open at the other end to receive a portion of the stabilizing means.

* * * * *